Jan. 15, 1946.  E. W. CONLON  2,392,835
AIRCRAFT CONSTRUCTION
Filed Sept. 11, 1942
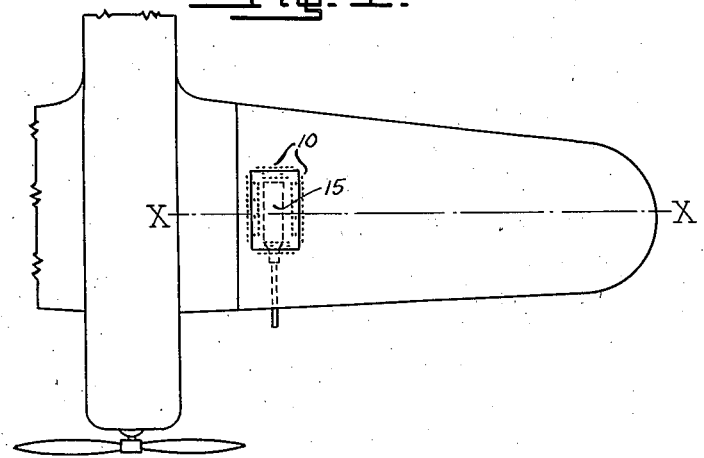
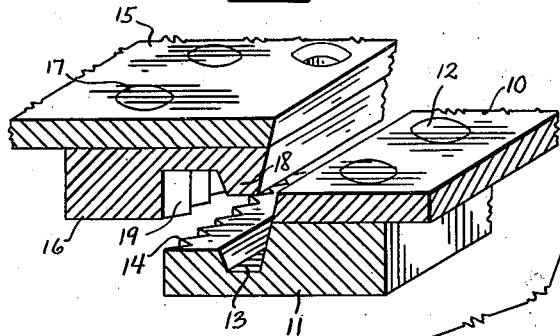
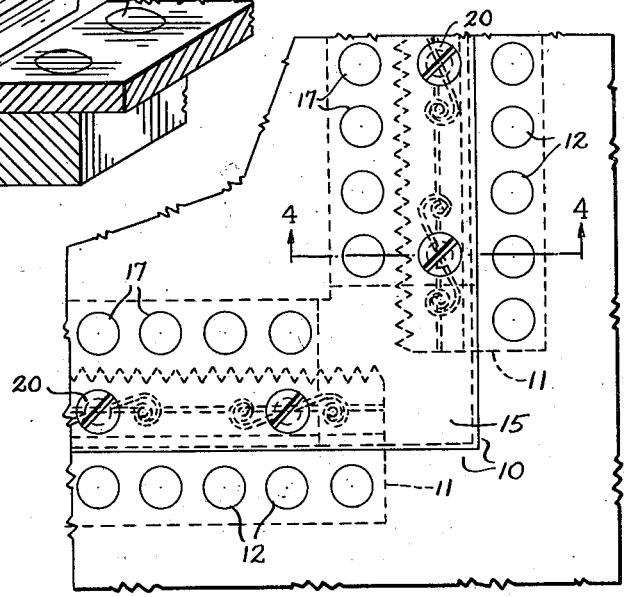
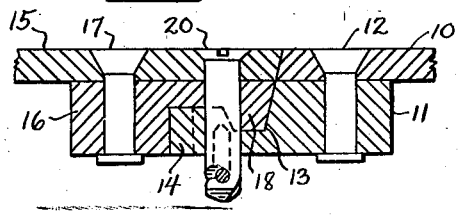
INVENTOR
Emerson W. Conlon
BY
ATTORNEY Patented Jan. 15, 1946

2,392,835

UNITED STATES PATENT OFFICE 2,392,835

AIRCRAFT CONSTRUCTION

Emerson W. Conlon, United States Navy

Application September 11, 1942, Serial No. 457,924

7 Claims. (Cl. 20—16)

(Granted under the act of March 3, 1883, as amended April 30, 1928; 370 O. G. 757)

In the construction of the wing and other sections of an aircraft subject to stresses while in flight one or more cut-outs are often provided in the surface of the section leading to the interior thereof. These openings are utilized for various purposes, one such purpose being to permit installations and servicing of wing mounted machine guns.

As is well known, when an aircraft is in flight, stresses are imposed upon the walls of the various aircraft sections. For example, the bottom wall of a wing section is in tension, the top wall in compression and shear is present in both top and bottom surfaces. Of course, when flying upside down, such compressional and tensional stresses would be reversed, i. e., the bottom wall of the wing would then be in compression and the top wall in tension. The cut-out in the wing surface therefore disturbs the proper distribution of these stresses in the wing and hence it is now necessary to reinforce the section of the wing adjacent the cut-out since the present type of door for closing the cut-out is incapable of properly transmitting the stresses thereacross.

The present invention relates to a cut-out structure and door therefor which will reduce considerably, if not eliminate altogether, any need for reinforcing the portion of the wing surrounding the cut-out.

While my invention can be applied to aircraft sections in which the wall of the section is utilized for carrying a relatively minor proportion of the load, it will be evident that it has particular utility in its application to aircraft sections where the wall carries substantially the entire load. Thus the invention can well be applied to a shell type wing in which the wall of the wing carries substantially all of the load.

In general, what is disclosed is a cut-out structure and door in which marginal portions of the cut-out and door are respectively provided with complementary connecting means which, when the door is closed, are so interconnected that wing stresses are carried across the door from one edge of the cut-out to the other in substantially the same manner as such stresses are transmitted throughout the remaining unbroken surface of the wall of the wing.

In the accompanying disclosure which represents a preferred embodiment of my invention as applied to a cut-out in a wing section of an aircraft, and in which like parts are indicated by like reference characters in the various views:

Fig. 1 is a plan view of the aircraft showing how a cut-out and door embodying my invention might be provided in the top wall surface of the wing;

Fig. 2 is an enlarged detail view in perspective showing the complementary connecting means utilized on door and cut-out;

Fig. 3 is a plan view of a corner portion of the door and cutout; and

Fig. 4 is a vertical section taken on lines 4—4 of Fig. 3.

Referring now to the drawing, the cut-out in the wing wall 10 is rectangular with two sides thereof arranged transversely of the longitudinal axis $x$—$x$ of the wing. Each marginal portion of the cut-out in the wing wall is provided with a strip fitting 11 attached thereto by means of a plurality of rivets 12. Strip 11 contains a groove 13, the side walls of which are plane and tapered and one of these walls lies flush with the tapered inner edge of the cut-out. The inner edge of the strip 11 is provided with a row of vertically extending teeth 14 and, as shown in Fig. 3, these rows of teeth and grooves in the strips 11 extend for substantially the entire length of the marginal portions of the cut-out.

In a similar manner, each marginal portion of the door, indicated at 15, is provided with a strip fitting 16 also attached thereto by means of a plurality of rivets 17. Strip 16 contains a ridge 18, the side walls of which are plane and tapered and one of these walls lies flush with the tapered inner edge of the door. Strip 16 is also provided with a row of vertical extending teeth 19 and, as also evident from Fig. 3, the rows of teeth and ridges in the strips 16 extend for substantially the entire length of the marginal portions of the door.

For attaching the door 15 in position over the cut-out in the wing 10, a plurality of quick detachable fasteners 20 which may be of the type described in U. S. Patent No. 1,955,740, may be utilized.

When the door 15 is in place over the cut-out 10, compression or tensional stresses are carried from the marginal portion of the cut-out to the door by means of the interconnection between ridge 18 and its complementary groove 13. Shear stresses are transmitted by means of the interconnection between the two complementary rows of teeth 14 and 19.

Due to the fact that a large number of complementary teeth are provided in each row and the latter extend for substantially the entire length of the marginal portions, it will be evident that the shear stresses are transmitted across the marginal portions of the cut-out and door substantially uniformly throughout their entire length.

Also, the interconnecting ridges and grooves extend for substantially the entire length of the marginal portions, presenting an unbroken interconnection therebetween so that compressional and torsional stresses are transmitted across the marginal portions of cut-out and door substantially uniformly throughout their entire length.

In the present embodiment of the invention, the grooves and ridges are shown incorporated in all marginal portions of the cut-out and door. While this construction may be preferred as it permits all of the strips for either the door or cut-out to be made alike and therefore is an economical construction, it is necessary to provide the interconnecting grooves and ridges only at those marginal portions across which compressional and tensional stresses are transmitted. Thus in the present application of the invention, such grooves and ridges might be incorporated only on those marginal portions of the cut-out and door which extend substantially transversely of the direction of the compressional and tensional stresses, such direction being longitudinal of the wing along the x—x axis.

Also, from the viewpoint of economy, although separate strips are provided to carry the described grooves, ridges and rows of interfitting teeth, it will be evident that such grooves, ridges and rows of teeth might be made as integral parts of the door and cut-out.

In conclusion, it will be evident that other modifications may be made in the present embodiment of my invention without departing from the spirit and scope thereof, and I therefore wish it to be understood that the appended claims are not to be limited to the specific embodiment illustrated but only as necessitated by the prior art.

The invention described herein may be manufactured and used by or for the United States of America for governmental purposes without the payment of any royalties thereon or therefor.

I claim:

1. In an aircraft surface member subject to compressional, tensional and shear stresses in the walls thereof, said member including a cut-out through one wall and a door for closing said cut-out, means for rigidly connecting marginal portions of said door and cutout comprising continuous complementary and interconnecting members extending substantially the entire length of said marginal portions for transmitting said compressional and tensional stresses across said marginal portions substantially uniformly throughout the entire length of said marginal portions and continuous complementary and interconnecting members extending substantially the entire length of said marginal portions for transmitting said sheer stresses across said marginal portions substantially uniformly throughout the entire length of said marginal portions.

2. In an aircraft surface member subject to stresses thereacross, said member including a cut-out and a door for closing said cut-out, two distinct means each extending continuously along marginal portions of said door and cut-out, the first of said means interconnecting marginal portions of said door and cut-out in such manner as to transmit stresses of compression and tension through the joint between door and cut-out at said marginal portions, the second of said means also interconnecting marginal portions of said door and cut-out and in such manner as to transmit stresses in shear through said joint, means extending along oppositely disposed marginal portions of said cut-out and door respectively for rigidly interconnecting marginal portions of said cut-out with said door to transmit said stresses across the latter, said interconnecting means being arranged so that said door when closed over said cut-out will lie flush with the surface of said aircraft surface member at said cut-out.

3. In an aircraft surface member subject to stresses thereacross, said member including a cut-out and a door for closing said cut-out, means for rigidly interconnecting marginal portions of said door with said cut-out comprising interconnecting rows of teeth and interconnecting grooves and ridges extending along marginal portions of said door and cut-out respectively, whereby said stresses will be transmitted substantially uniformly across said marginal portions when said door is closed over said cut-out.

4. In an aircraft surface member subject to compressional, tensional and shear stresses in the walls thereof, said member including a cut-out through one wall and a door for closing said cut-out, means for rigidly connecting marginal portions of said door and cut-out comprising complementary and interconnecting grooves and ridges extending along oppositely disposed marginal portions of said door and cut-out respectively for transmitting said compressional and tensional stresses thereacross, and complementary and interconnecting rows of teeth also extending along said oppositely disposed marginal portions for transmitting said shear stresses thereacross.

5. In an aircraft surface member subject to compressional, tensional and shear stresses in the walls thereof, said member including a cut-out through one wall thereof and a door for closing said cut-out, said cut-out being so disposed that opposite marginal portions thereof and of said door extend substantially transversely to the direction of said compressional and tensional stresses, means for rigidly interconnecting marginal portions of said door and cut-out comprising complementary and interconnecting grooves and ridges extending along said opposite marginal portions of said cut-out and door respectively for transmitting said compressional and tensional stresses thereacross, and complementary and interconnecting rows of teeth extending along all marginal portions of said cut-out and door respectively for transmitting said shear stresses thereacross.

6. In an aircraft surface member subject to compressional, tensional and shear stresses in the walls thereof, said member including a rectangular cut-out through one wall thereof and a door for closing said cut-out, means for rigidly connecting marginal portions of said door and said cut-out comprising complementary and interconnecting grooves and ridges extending along at least one pair of oppositely disposed marginal portions of said door and cut-out respectively for transmitting said compressional and tensional stresses thereacross, and complementary and interconnecting rows of teeth extending along both pairs of oppositely disposed marginal portions of said door and cut-out respectively for transmitting said shear stresses thereacross.

7. In an aircraft surface member subject to stresses thereacross, said member including a cut-out and a door for closing said cut-out, means for rigidly interconnecting marginal portions of said cut-out and door so that said stresses will be transmitted across said marginal portions, said means comprising complementary sets of marginal strips for said cut-out and door respectively, each strip in one of said sets being provided with a longitudinally extending groove and a row of teeth and each strip in the other said set being provided with a longitudinally extending ridge and row of teeth interconnected with the groove and row of teeth of each strip included in said first mentioned set, and means for securing said sets of strips to the undersides of said cut-out and door respectively whereby said door when closed over said cut-out will lie flush with the surface of said aircraft surface member at said cut-out.

EMERSON W. CONLON.